(12) United States Patent
Chow et al.

(10) Patent No.: US 11,206,705 B2
(45) Date of Patent: Dec. 21, 2021

(54) FLEXIBLE CARRIER DOWNLINK AND UPLINK PAIRING FOR ADVANCED NETWORKS

(71) Applicant: AT&T Mobility II LLC, Atlanta, GA (US)

(72) Inventors: Gary Chow, Irvine, CA (US); Yi Shen, Seminole, FL (US)

(73) Assignee: AT&T MOBILITY II LLC, Atlanta, GA (US)

( * ) Notice: Subject to any disclaimer, the term of this patent is extended or adjusted under 35 U.S.C. 154(b) by 223 days.

(21) Appl. No.: 16/042,608

(22) Filed: Jul. 23, 2018

(65) Prior Publication Data
US 2020/0029377 A1    Jan. 23, 2020

(51) Int. Cl.
*H04W 24/10* (2009.01)
*H04W 4/12* (2009.01)
(Continued)

(52) U.S. Cl.
CPC .............. *H04W 76/15* (2018.02); *H04B 1/10* (2013.01); *H04W 24/08* (2013.01); *H04W 72/0453* (2013.01); *H04W 72/0486* (2013.01)

(58) Field of Classification Search
CPC ..... H04B 1/10; H04L 5/001; H04L 27/26025; H04L 5/0007; H04L 5/0053;
(Continued)

(56) References Cited

U.S. PATENT DOCUMENTS

| 5,287,544 A | 2/1994 | Menich et al. |
| 5,956,642 A | 9/1999 | Larsson et al. |

(Continued)

FOREIGN PATENT DOCUMENTS

| WO | 9534138 A1 | 12/1995 |
| WO | 2008105718 A1 | 9/2008 |

(Continued)

OTHER PUBLICATIONS

Zhang, Hao, et al. "Resource Allocation with Subcarrier Pairing in OFDMA Two-Way Relay Networks." IEEE Wireless Communications Letters 1.2 (2012): 61-64. 5 pages. https://arxiv.org/pdf/1201.0081.pdf.

*Primary Examiner* — Edan Orgad
*Assistant Examiner* — Vanneilian Lalchinthang
(74) *Attorney, Agent, or Firm* — Amin, Turocy & Watson, LLP

(57) ABSTRACT

Various embodiments disclosed herein provide for flexible carrier uplink and downlink pairing for 4G, 5G and future networks. Downlink and uplink channels can be assigned to different bands that are not contiguous or bands that have different bandwidths. This enables base station devices to have the flexibility to assign uplink and downlink communications to bands that have lower load and thus improve the efficiency and throughput of the communication link for both uplink and downlink. The base station device can also assign uplink and downlink pairing in order to minimize passive intermodulation interference. Passive intermodulation interference from a transmission can cause interference in bands near the transmission band, and so the base station device can assign downlink and uplink bands that are separate from each other in order to reduce the passive intermodulation interference.

20 Claims, 10 Drawing Sheets

(51) Int. Cl.
*H04W 72/00* (2009.01)
*H04W 76/15* (2018.01)
*H04B 1/10* (2006.01)
*H04W 72/04* (2009.01)
*H04W 24/08* (2009.01)

(58) Field of Classification Search
CPC ... H04L 5/0098; H04L 5/0044; H04L 5/0091; H04W 24/08; H04W 76/15; H04W 72/0486; H04W 72/0453; H04W 72/0446; H04W 8/24; H04W 48/12
USPC ......................................................... 370/329
See application file for complete search history.

(56) References Cited

U.S. PATENT DOCUMENTS

| | | | |
|---|---|---|---|
| 5,963,865 A | 10/1999 | Desgagne et al. | |
| 6,334,057 B1 | 12/2001 | Malmgren et al. | |
| 6,804,214 B1 | 10/2004 | Lundh et al. | |
| 7,155,233 B2 | 12/2006 | Nagato et al. | |
| 7,418,269 B2 | 8/2008 | Edwards | |
| 8,385,217 B2 | 2/2013 | Zhang et al. | |
| 8,917,673 B2 | 12/2014 | Kapoor et al. | |
| 9,107,200 B1* | 8/2015 | Naim | H04W 72/02 |
| 9,178,635 B2 | 11/2015 | Ben-shlomo | |
| 9,497,732 B2 | 11/2016 | Bhattad et al. | |
| 9,565,655 B2 | 2/2017 | Love et al. | |
| 9,743,288 B2 | 8/2017 | Grosspietsch et al. | |
| 9,743,412 B2 | 8/2017 | Yanagisawa et al. | |
| 10,314,074 B2* | 6/2019 | Kim | H04W 74/0833 |
| 2003/0013455 A1 | 1/2003 | Shoji et al. | |
| 2005/0286547 A1* | 12/2005 | Baum | H04B 1/707 370/437 |
| 2011/0190011 A1* | 8/2011 | Choi | H04L 5/001 455/466 |
| 2012/0322455 A1* | 12/2012 | Oh | H04L 5/001 455/450 |
| 2013/0003692 A1* | 1/2013 | Nishio | H04L 5/001 370/329 |
| 2014/0126548 A1* | 5/2014 | Tian | H04W 68/02 370/335 |
| 2018/0234872 A1* | 8/2018 | Xie | H04L 5/0091 |

FOREIGN PATENT DOCUMENTS

| | | |
|---|---|---|
| WO | 2016141519 A1 | 9/2016 |
| WO | 2017024467 A1 | 2/2017 |
| WO | 2017034125 A1 | 3/2017 |
| WO | 2017188423 A1 | 11/2017 |
| WO | 2018012774 A1 | 1/2018 |
| WO | 2018059264 A1 | 4/2018 |
| WO | 2018075569 A1 | 4/2018 |

\* cited by examiner

FLEXIBLE CARRIER DOWNLINK AND UPLINK PAIRING FOR ADVANCED NETWORKS

TECHNICAL FIELD

The present application relates generally to the field of mobile communication and, more specifically, to conveying pairing uplink and downlink channels in a next generation wireless communication system.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G and other next generation network standards.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
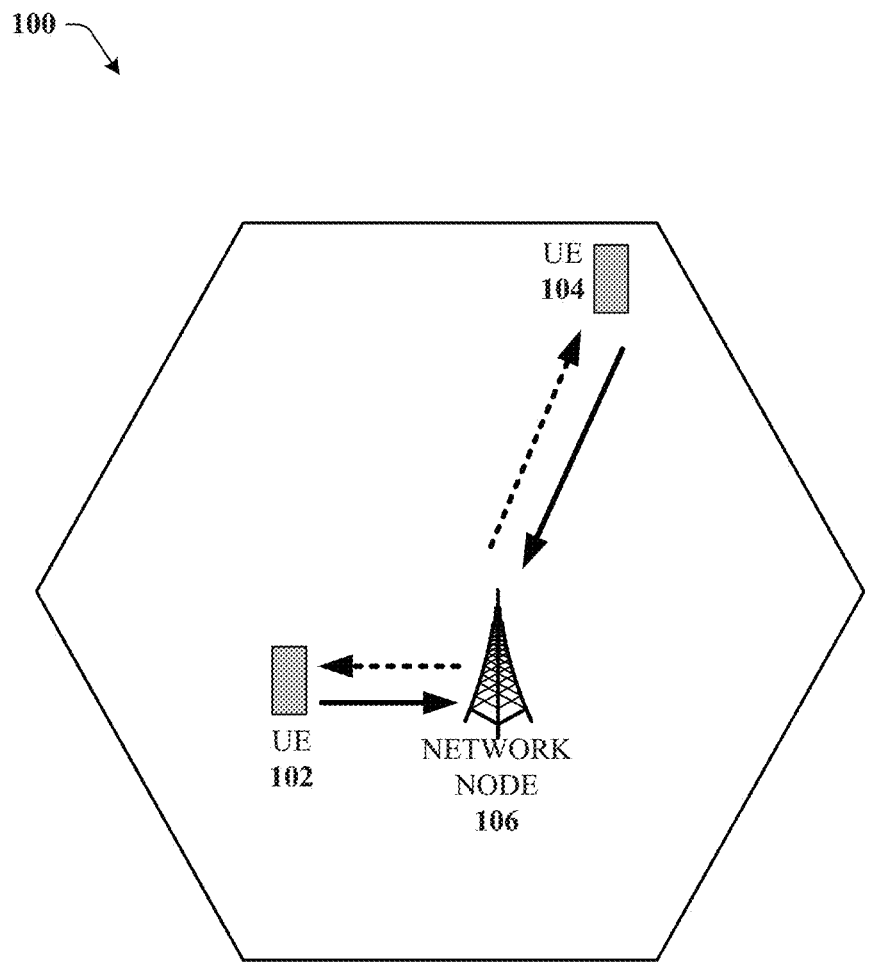
FIG. 1 illustrates an example wireless communication system in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

Various embodiments disclosed herein provide for flexible carrier uplink and downlink pairing. Downlink and uplink channels can be assigned to different bands that are not contiguous or bands that have different bandwidths. This enables base station devices to have the flexibility to assign uplink and downlink communications to bands that have lower load and thus improve the efficiency and throughput of the communication link for both uplink and downlink. The base station device can also assign uplink and downlink pairing in order to minimize passive intermodulation interference. Passive intermodulation interference from a transmission can cause interference in bands near the transmission band, and so the base station device can assign downlink and uplink bands that are separate from each other in order to reduce the passive intermodulation interference.

In various embodiments, a base station device can comprise a processor and a memory that stores executable instructions that, when executed by the processor facilitate performance of operations. The operations can comprise transmitting a first indicator to a mobile device to indicate to the mobile device that the base station supports flexible uplink and downlink pairing. The operations can also comprise in response to the transmitting, receiving, from the mobile device, a second indicator that indicates uplink sub-bands supported by the mobile device and downlink sub-bands supported by the mobile device. The operations can also comprise selecting an uplink sub-band of the uplink sub-bands and selecting a downlink band of the downlink sub-bands for a communication link with the mobile device, wherein the uplink sub-band and the downlink sub-band are not contiguous and are asymmetric in bandwidth.

In another embodiment, a method comprises signaling, by a base station device comprising a processor, to a user equipment device, a master information block comprising an indication that the base station device supports flexible uplink and downlink pairing. The method can also comprise receiving, by the base station device, an indication from the user equipment device that indicates a group of uplink bands supported by the user equipment device and a group of downlink bands supported by the user equipment device. The method can also comprise selecting, by the base station device, an uplink band of the group of uplink bands and a downlink band of the group of downlink bands, wherein the uplink band and the downlink band are not adjacent to each other and are asymmetric in bandwidth.

In another embodiment, a user equipment device comprises is provided that comprises a processor and a memory that stores executable instructions that when executed by the processor facilitate performance of operations. The operations can comprise transmitting a first indicator to a base station device, wherein the first indicator indicates that the user equipment device supports flexible uplink and downlink pairing. The operations can also comprise in response to the transmitting, receiving, from the base station device, a second indicator that indicates uplink sub-bands and downlink sub-bands supported by the base station device. The operations can also comprise selecting an uplink sub-band of the uplink sub-bands supported and selecting a downlink band of the downlink sub-bands supported for a communication link with the base station device, wherein the uplink sub-band and the downlink sub-band are associated with different bands and are asymmetric in bandwidth.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

FIG. 1 illustrates an example wireless communication system 100 in accordance with various aspects and embodiments of the subject disclosure. In one or more embodiments, system 100 can comprise one or more user equipment UEs 104 and 102, which can have one or more antenna panels having vertical and horizontal elements. A UE 102 can be a mobile device such as a cellular phone, a smartphone, a tablet computer, a wearable device, a virtual reality (VR) device, a heads-up display (HUD) device, a smart car, a machine-type communication (MTC) device, and the like. UE 102 can also refer to any type of wireless device that communicates with a radio network node in a cellular or mobile communication system. Examples of UE 102 are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. User equipment UE 102 can also comprise IOT devices that communicate wirelessly. In various embodiments, system 100 is or comprises a wireless communication network serviced by one or more wireless communication network providers. In example embodiments, a UE 102 can be communicatively coupled to the wireless communication network via a network node 106.

The non-limiting term network node (or radio network node) is used herein to refer to any type of network node serving a UE 102 and UE 104 and/or connected to other network node, network element, or another network node from which the UE 102 or 104 can receive a radio signal. Network nodes can also have multiple antennas for performing various transmission operations (e.g., MIMO operations). A network node can have a cabinet and other protected enclosures, an antenna mast, and actual antennas. Network nodes can serve several cells, also called sectors, depending on the configuration and type of antenna. Examples of network nodes (e.g., network node 106) can comprise but are not limited to: NodeB devices, base station (BS) devices, access point (AP) devices, and radio access network (RAN) devices. The network node 106 can also comprise multi-standard radio (MSR) radio node devices, including but not limited to: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like. In 5G terminology, the node 106 can be referred to as a gNodeB device.

Wireless communication system 100 can employ various cellular technologies and modulation schemes to facilitate wireless radio communications between devices (e.g., the UE 102 and 104 and the network node 106). For example, system 100 can operate in accordance with a UMTS, long term evolution (LTE), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), single-carrier FDMA (SC-FDMA), OFDM, (DFT)-spread OFDM or SC-FDMA)), FBMC, ZT DFT-s-OFDM, GFDM, UFMC, UW DFT-Spread-OFDM, UW-OFDM, CP-OFDM, resource-block-filtered OFDM, and UFMC. However, various features and functionalities of system 100 are particularly described wherein the devices (e.g., the UEs 102 and 104 and the network device 106) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs).

In an embodiment, radio resource control (RRC) signaling can be established between network node 106 and UE 102 and/or 104. The RRC signaling can be established by either of the UEs or the network node 106, and in response to the RRC signaling, the network node 106 can send to the UE 102 or 104 an indicator that the network node 106 supports the flexible carrier uplink and downlink pairing mechanism disclosed here. The indicator can also indicate which bands, frequencies, spectrum ranges, and other capabilities are supported by the network node 106. The RRC signaling can also be used by the network node 106 to send a capability request to UE 102 and/or 104. The capability message sent by the UE 102 or the UE 104 back to the network node 106 can include a variety information relating to the UE's radio access capabilities including which of the bands are supported by the UE 102 or 104 of the bands indicated that are supported by the network node 106 in the first indicator.

The flexible pairing disclosed herein has several advantages over carrier aggregation services that are currently provided. Carrier aggregation allows mobile network operators to combine a number of separate LTE carriers. This enables them to increase the peak user data rates and overall capacity of their networks and to exploit fragmented spectrum allocations.

Carrier aggregation has some benefit at lower traffic levels (e.g., low uplink and downlink utilization in rural cells). As cells get busier however, with high uplink utilization in urban cells, the benefit of carrier aggregation decreases significantly. Additionally, with regular Frequency Division Multiplexing, the uplink bands and downlink bands are symmetric and contiguous, where the uplink bands and downlink bands are next to each other and the same size, bandwidth, etc.

Different bands however may be underutilized at different times and in different locations, depending on load, traffic, and other circumstances. Therefore, having the flexibility to assign uplink and downlink to different bands, sub-bands within bands, and where the bands/sub-bands may not be contiguous or have the same bandwidths, can greatly improve system throughput.

Once the network node 106 receives the indication of which bands the UE 102 or 104 support, the network node 106 can assign the uplink and downlink channels to one or more bands. The selection can be based on the relative loads of the available bands, the load requirements of the uplink and downlink channels, and/or on the basis of reducing passive intermodulation interference. Assigning the uplink channel to a band that is not contiguous with a downlink channel can reduce the amount of passive intermodulation interference, which generally more strongly affect nearby bands.

In an embodiment, the downlink band assigned can be larger than the uplink band assigned, as generally more data transmitted on the downlink. In other embodiments, the bands and bandwidth selected can be on the basis of the load, or expected load of each of the uplink and downlink channels. In an embodiment, the bands assigned can be based on the packet data protocol context associated with the UE 102 or 104, and the quality of service requested and/or desired, as well as on the type of application being used data throughput requirements, and other factors associated with the relative and absolute amounts of data to be transferred over the uplink and downlink channels. For instance, the downlink channel can be 15 MHz wide and then uplink can be 5 Mhz, since a portion of the uplink band may be in use by somebody else. The flexible carrier uplink and downlink pairing disclosed herein provides flexibility in mixing and matching different spectrum blocks in terms of frequency and bandwidth.

Figure 2:
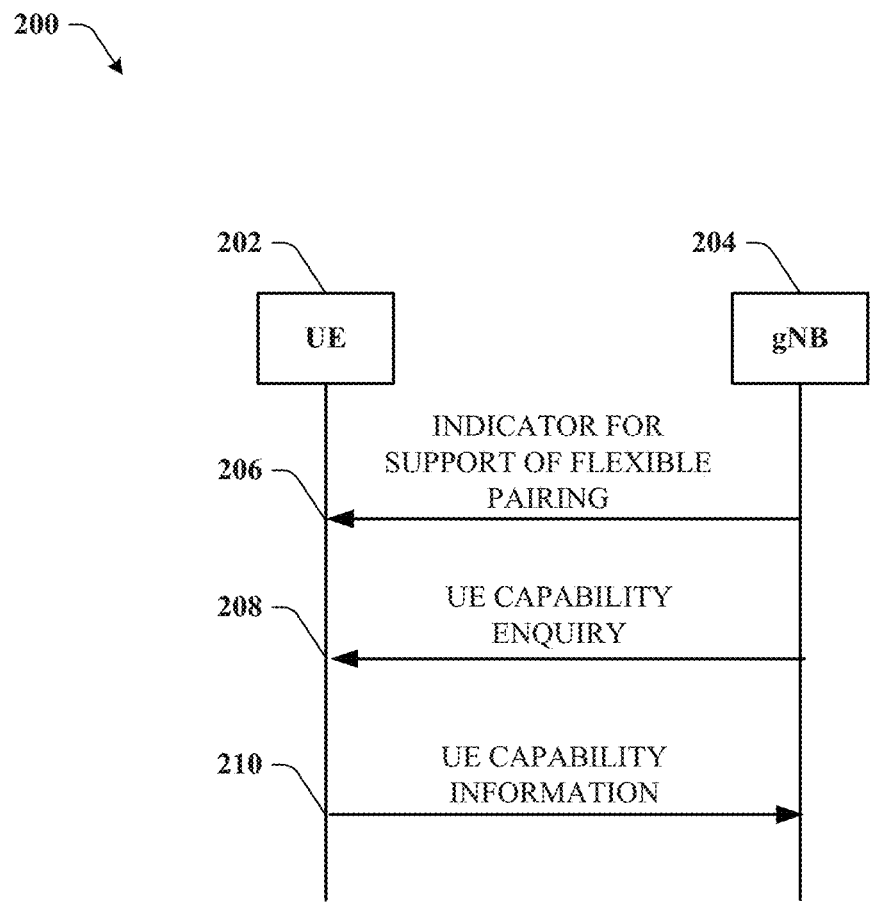
FIG. 2 illustrates an example block diagram showing a message sequence chart in accordance with various aspects and embodiments of the subject disclosure.

Turning now to FIG. 2, illustrated is an example block diagram showing a message sequence chart in accordance with various aspects and embodiments of the subject disclosure.

In an embodiment, a UE device 202 or a gNB 204 (or eNB, or other base station device or RAN device) can initiate RRC setup and send an indicator that indicates support of flexible pairing. The indicator can be independent or part of a master information block that also lists carriers, bands, and/or channels supported by the gNB 204. The gNB 204 can then send a UE capability enquiry 208 to the UE device 202 and the UE device can send a UE capability message 210 back to the gNB 204. The UE capability message 210 can comprise information identifying which of the carriers, channels, and bands supported by the gNB 204 are also supported by the UE 202. Based on this information, the gNB 204 can configure UE 202 to use the uplink and downlink pairing selected by gNB 204.

Figure 3:
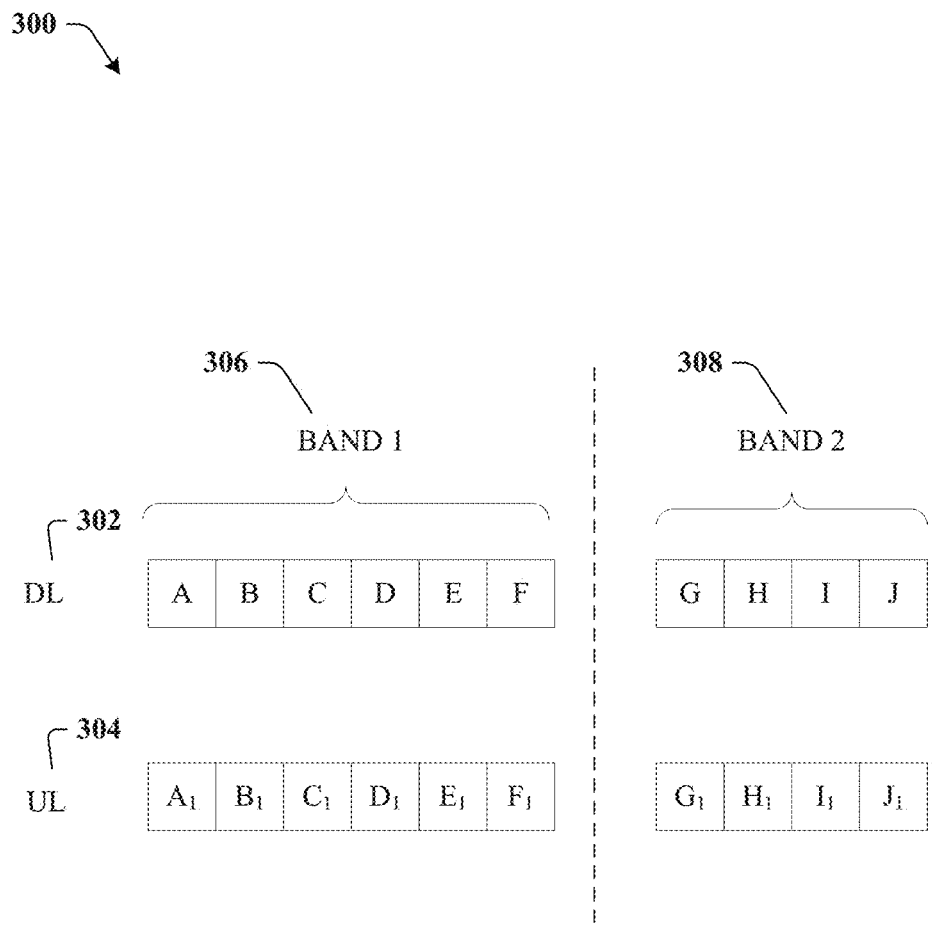
FIG. 3 illustrates an example block diagram showing a group of bands and sub-bands in accordance with various aspects and embodiments of the subject disclosure.

Turning now to FIG. 3, illustrated is an example block diagram 300 showing a group of bands and sub-bands in accordance with various aspects and embodiments of the subject disclosure.

As merely an example, downlink bands 302 can include a set of sub-bands A, B, C, D, E, and F of Band 1 306, and sub-bands G, H, I, and J of Band 2 308. Likewise, uplink bands 304 can include set of sub-bands $A_1$, $B_1$, $C_1$, $D_1$, $E_1$, and $F_1$ of Band 1 306, and sub-bands $G_1$, $H_1$, $I_1$, and $J_1$ of Band 2 308. This is merely an example embodiment, and in other embodiments, there can be bands of different sizes, bandwidths, with different numbers of bands and/or sub-bands.

In an embodiment, base station device can select one or more of the downlink bands 302 (e.g., C, D, and/or E) and then select $G_1$ for the uplink. In an embodiment, the uplink and downlink bands selected can be non-contiguous in some embodiments and contiguous in other embodiments. The uplink and downlink bands can also be of varying sizes (e.g., bandwidth). Although they are shown as the same size in FIG. 3, it is to be appreciated that the bands and/or subbands can have different sizes (e.g., range of frequencies).

In an embodiment, if the load on one of the selected bands, either uplink or downlink go above or below a predefined load, the base station device can adjust the pairing, and select a new band for the uplink or downlink channel. When selecting the bands in the first place, the base station device can also assign the bands based on the relative/absolute load of the bands, the expected load of the uplink and/or downlink channels and other factors in order to optimize data throughput.

Figure 4:
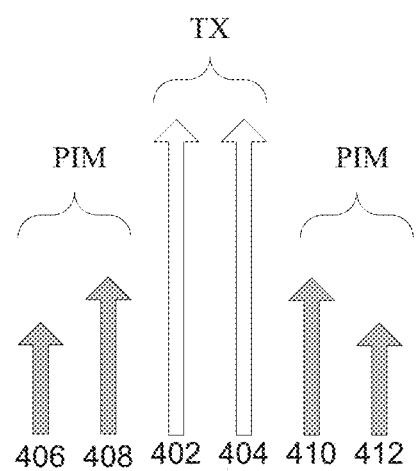
FIG. 4 illustrates an example block diagram of transmit channels and passive intermodulation in accordance with various aspects and embodiments of the subject disclosure.

Turning now to FIG. 4, illustrated is an example block diagram 400 of transmit channels and passive intermodulation in accordance with various aspects and embodiments of the subject disclosure. Passive intermodulation interference is the generation of interfering signals caused by nonlinearities in the mechanical components of a wireless system. Two signals mix together (amplitude modulation) to produce sum and difference signals and products within the same band, causing interference. The interaction of mechanical components generally causes the nonlinear elements, especially anywhere that two different metals come together. Junctions of dissimilar materials are a prime cause. PIM occurs in antenna elements, coax connectors, coax cable, and grounds. It is caused by rust, corrosion, loose connections, dirt, oxidation, and any contamination of these factors. Even nearby metal objects such as guy wires and anchors, roof flashings, and pipes can cause PIM. The result is a diode-like nonlinearity that makes an excellent mixer. As nonlinearity increases, so does the amplitude of the PIM signals. Typically, two relatively strong RF signals relatively close in frequency are required to trigger PIM effects. The outputs from two or more high-power (2.0 W or so) transmitters are enough to create the PIM effects. The higher the power used, the greater the PIM signals generated. As the PIM generated can bleed over into other bands, having transmit and receive channels near each other can make them more susceptible to PIM.

As seen in FIG. 4, transmissions 402 and 406 can cause PIM 406, 408, 41.0, and 412 in neighboring bands. The amplitude can decrease as the distance from the source increases. When NM falls in the uplink UL, it impairs network performance and, in some cases, can prevent an operator from bringing up a new band completely. In an embodiment, PIM from the uplink can found on Band 17 700BC UL due to interference from Band 29 700DE DL and Band 14 700FIRSTNET DL. With the Flexible Carrier Feature the Band 17 700BC UL can be swapped out and replaced with another UL band e.g., Band 2 1900 UL, which is immune from PIM interference from 700DE and 700FIRSTNET. Flexible Carrier will allow any combination of UL/DL band pairing to mitigate or eliminate PIM issues at multi-carrier LTE sites.

The base station can select the uplink and downlink pairings to reduce PIM from the outset, or if the level of PIM goes above a defined threshold, the base station can adjust the uplink and downlink pairings to reduce PIM below the threshold.

Figure 5:
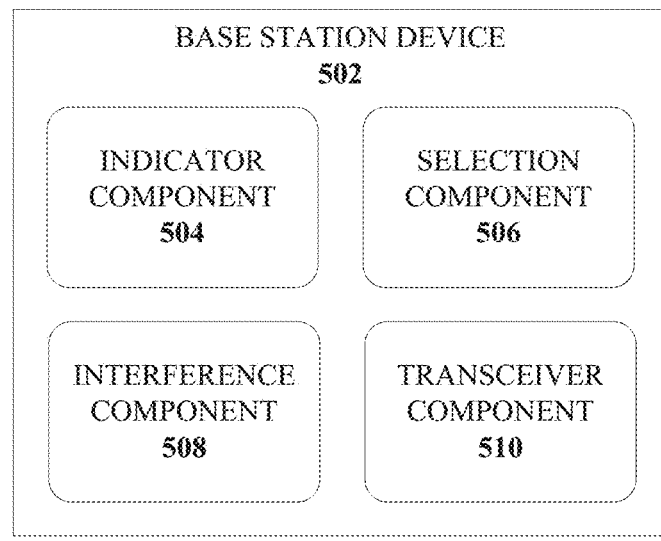
FIG. 5 illustrates an example block diagram of a base station device in accordance with various aspects and embodiments of the subject disclosure.

Turning now to FIG. 5, illustrated is an example block diagram 500 of a base station device 502 in accordance with various aspects and embodiments of the subject disclosure.

Base station device 502 can include an indicator component 504 that can be configured to generate an indication that the base station device 502 supports flexible pairing as disclosed herein. The indicator can also indicate which bands, frequencies, spectrum ranges, and other capabilities are supported by the base station device 502. The indicator component 504 can also prepare a capability request that the transceiver component 510 can send to the UE. The UE can send back a capability message, received by the transceiver component 510 that can include a variety of information relating to the UE's radio access capabilities including which of the bands are supported by the UE.

Different bands however may be underutilized at different times and in different locations, depending on load, traffic, and other circumstances. Therefore, having the flexibility to assign uplink and downlink to different bands, sub-bands within bands, and where the bands/sub-bands may not be contiguous or have the same bandwidths, can greatly improve system throughput. Selection component 506 can assign the uplink and downlink channels to one or more bands based on the bands available. The selection can be based on the relative loads of the available bands, the load requirements of the uplink and downlink channels, and/or on the basis of reducing passive intermodulation interference. The interference component 508 can measure the PIM in the various bands assigned to the uplink and downlink and prompt selection component 506 to select a new band(s) when the PIM goes above a predefined threshold.

Figure 6:
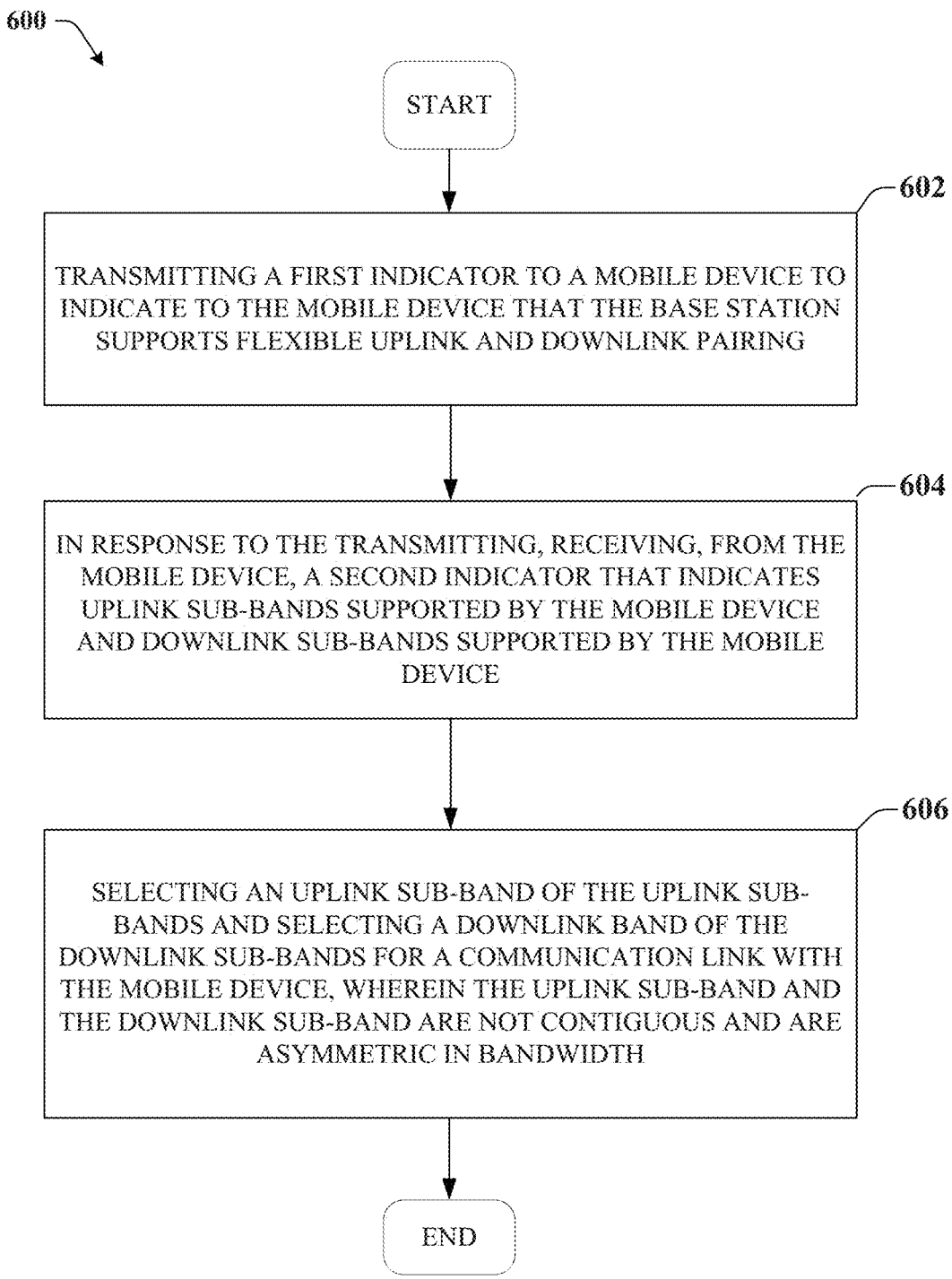
FIG. 6 illustrates an example method for flexibly pairing downlink and uplink channels in accordance with various aspects and embodiments of the subject disclosure.
Figure 7:
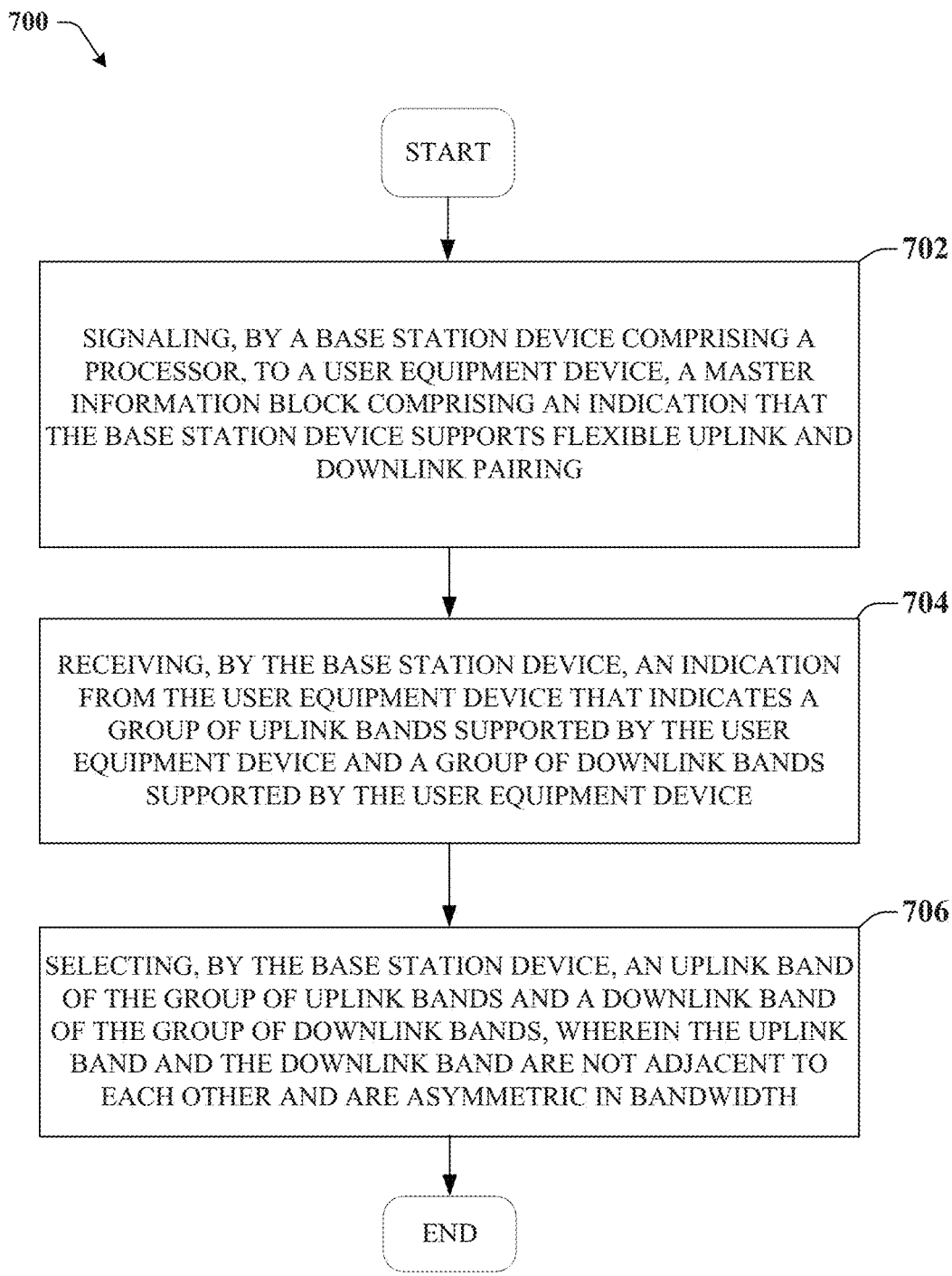
FIG. 7 illustrates an example method for flexibly pairing downlink and uplink channels in accordance with various aspects and embodiments of the subject disclosure.

FIGS. 6-7 illustrates a process in connection with the aforementioned systems. The processes in FIGS. 6-7 can be implemented for example by the systems in FIGS. 1-5 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 6 illustrates an example method 600 for flexibly pairing downlink and uplink channels in accordance with various aspects and embodiments of the subject disclosure.

Method 600 can begin at 602 where the method includes transmitting a first indicator to a mobile device to indicate to the mobile device that the base station supports flexible uplink and downlink pairing.

At 604, the method includes in response to the transmitting, receiving, from the mobile device, a second indicator that indicates uplink sub-bands supported by the mobile device and downlink sub-bands supported by the mobile device.

At 606, the method includes selecting an uplink sub-band of the uplink sub-bands and selecting a downlink band of the downlink sub-bands for a communication link with the mobile device, wherein the uplink sub-band and the downlink sub-band are not contiguous and are asymmetric in bandwidth.

FIG. 7 illustrates an example method 700 for flexibly pairing downlink and uplink channels in accordance with various aspects and embodiments of the subject disclosure.

Method 700 can begin at 702 where the method includes signaling, by a base station device comprising a processor, to a user equipment device, a master information block comprising an indication that the base station device supports flexible uplink and downlink pairing.

At 704, the method includes receiving, by the base station device, an indication from the user equipment device that indicates a group of uplink bands supported by the user equipment device and a group of downlink bands supported by the user equipment device.

At 706, the method includes selecting, by the base station device, an uplink band of the group of uplink bands and a downlink band of the group of downlink bands, wherein the uplink band and the downlink band are not adjacent to each other and are asymmetric in bandwidth.

Figure 8:
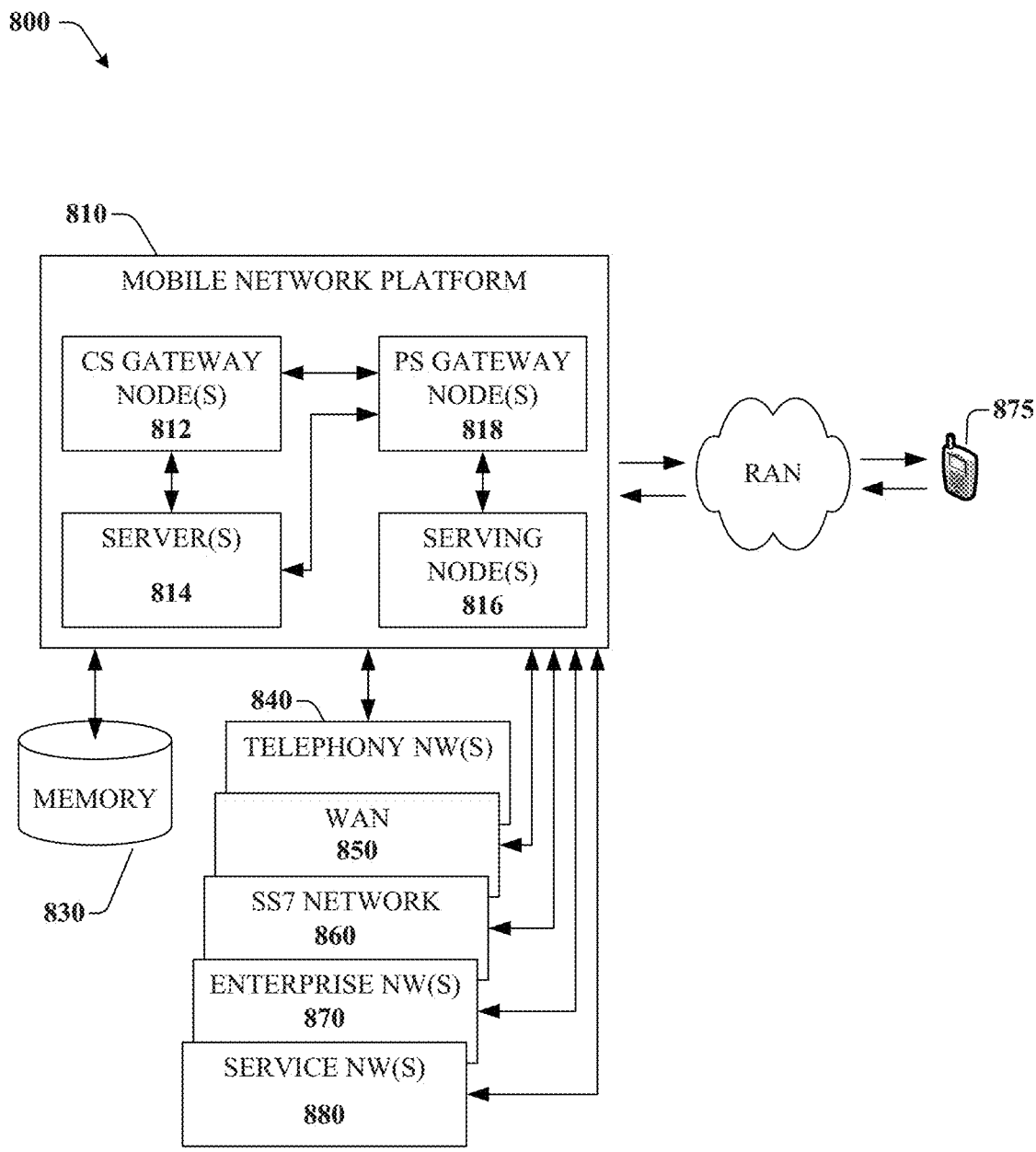
FIG. 8 illustrates an example block diagram of a non-limiting embodiment of a mobile network platform in accordance with various aspects described herein.

FIG. 8 presents an example embodiment 800 of a mobile network platform 810 that can implement and exploit one or more aspects of the disclosed subject matter described herein. Generally, wireless network platform 810 can include components, e.g., nodes, gateways, interfaces, servers, or disparate platforms, that facilitate both packet-switched (PS) (e.g., internet protocol (IP), frame relay, asynchronous transfer mode (ATM) and circuit-switched (CS) traffic (e.g., voice and data), as well as control generation for networked wireless telecommunication. As a non-limiting example, wireless network platform 810 can be included in telecommunications carrier networks, and can be considered carrier-side components as discussed elsewhere herein. Mobile network platform 810 includes CS gateway node(s) 812 which can interface CS traffic received from legacy networks like telephony network(s) 840 (e.g., public switched telephone network (PSTN), or public land mobile network (PLMN)) or a signaling system #7 (SS7) network 860. Circuit switched gateway node(s) 812 can authorize and authenticate traffic (e.g., voice) arising from such networks. Additionally, CS gateway node(s) 812 can access mobility, or roaming, data generated through SS7 network 870; for instance, mobility data stored in a visited location register (VLR), which can reside in memory 830. Moreover, CS gateway node(s) 812 interfaces CS-based traffic and signaling and PS gateway node(s) 818. As an example, in a 3GPP UMTS network, CS gateway node(s) 812 can be realized at least in part in gateway GPRS support node(s) (GGSN). It should be appreciated that functionality and specific operation of CS gateway node(s) 812, PS gateway node(s) 818, and serving node(s) 816, is provided and dictated by radio technology(ies) utilized by mobile network platform 810 for telecommunication. Mobile network platform 810 can also include the MMEs, HSS/PCRFs, SGWs, and PGWs disclosed herein.

In addition to receiving and processing CS-switched traffic and signaling, PS gateway node(s) 818 can authorize and authenticate PS-based data sessions with served mobile devices. Data sessions can include traffic, or content(s), exchanged with networks external to the wireless network platform 810, like wide area network(s) (WANs) 850, enterprise network(s) 870, and service network(s) 880, which can be embodied in local area network(s) (LANs), can also be interfaced with mobile network platform 810 through PS gateway node(s) 818. It is to be noted that WANs 850 and enterprise network(s) 870 can embody, at least in part, a service network(s) like IP multimedia subsystem (IMS). Based on radio technology layer(s) available in technology resource(s) 817, packet-switched gateway node(s) 818 can generate packet data protocol contexts when a data session is established; other data structures that facilitate routing of packetized data also can be generated. To that end, in an aspect, PS gateway node(s) 818 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 800, wireless network platform 810 also includes serving node(s) 816 that, based upon available radio technology layer(s) within technology resource(s) 817, convey the various packetized flows of data streams received through PS gateway node(s) 818. It is to be noted that for technology resource(s) 817 that rely primarily on CS communication, server node(s) can deliver traffic without reliance on PS gateway node(s) 818; for example, server node(s) can embody at least in part a mobile switching center. As an example, in a 3GPP UMTS network, serving node(s) 816 can be embodied in serving GPRS support node(s) (SGSN).

For radio technologies that exploit packetized communication, server(s) 814 in wireless network platform 810 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 810. Data streams (e.g., content(s) that are part of a voice call or data session) can be conveyed to PS gateway node(s) 818 for authorization/authentication and initiation of a data session, and to serving node(s) 816 for communication thereafter. In addition to application server, server(s) 814 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 810 to ensure network's operation and data integrity in addition to authorization and authentication procedures that CS gateway node(s) 812 and PS gateway node(s) 818 can enact. Moreover, provisioning server(s) can provision services from external network(s) like networks operated by a disparate service provider; for instance, WAN 850 or Global Positioning System (GPS) network(s) (not shown). Provisioning server(s) can also provision coverage through networks associated to wireless network platform 810 (e.g., deployed and operated by the same service provider), such as femto-cell network(s) (not shown) that enhance wireless service coverage within indoor confined spaces and offload RAN resources in order to enhance subscriber service experience within a home or business environment by way of UE 875.

It is to be noted that server(s) 814 can include one or more processors configured to confer at least in part the functionality of macro network platform 810. To that end, the one or more processor can execute code instructions stored in memory 830, for example. It is should be appreciated that server(s) 814 can include a content manager 815, which operates in substantially the same manner as described hereinbefore.

In example embodiment 800, memory 830 can store information related to operation of wireless network platform 810. Other operational information can include provisioning information of mobile devices served through wireless platform network 810, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 830 can also store information from at least one of telephony network(s) 840, WAN 850, enterprise network(s) 870, or SS7 network 870. In an aspect, memory 830 can be, for example, accessed as part of a data store component or as a remotely connected memory store.

Figure 9:
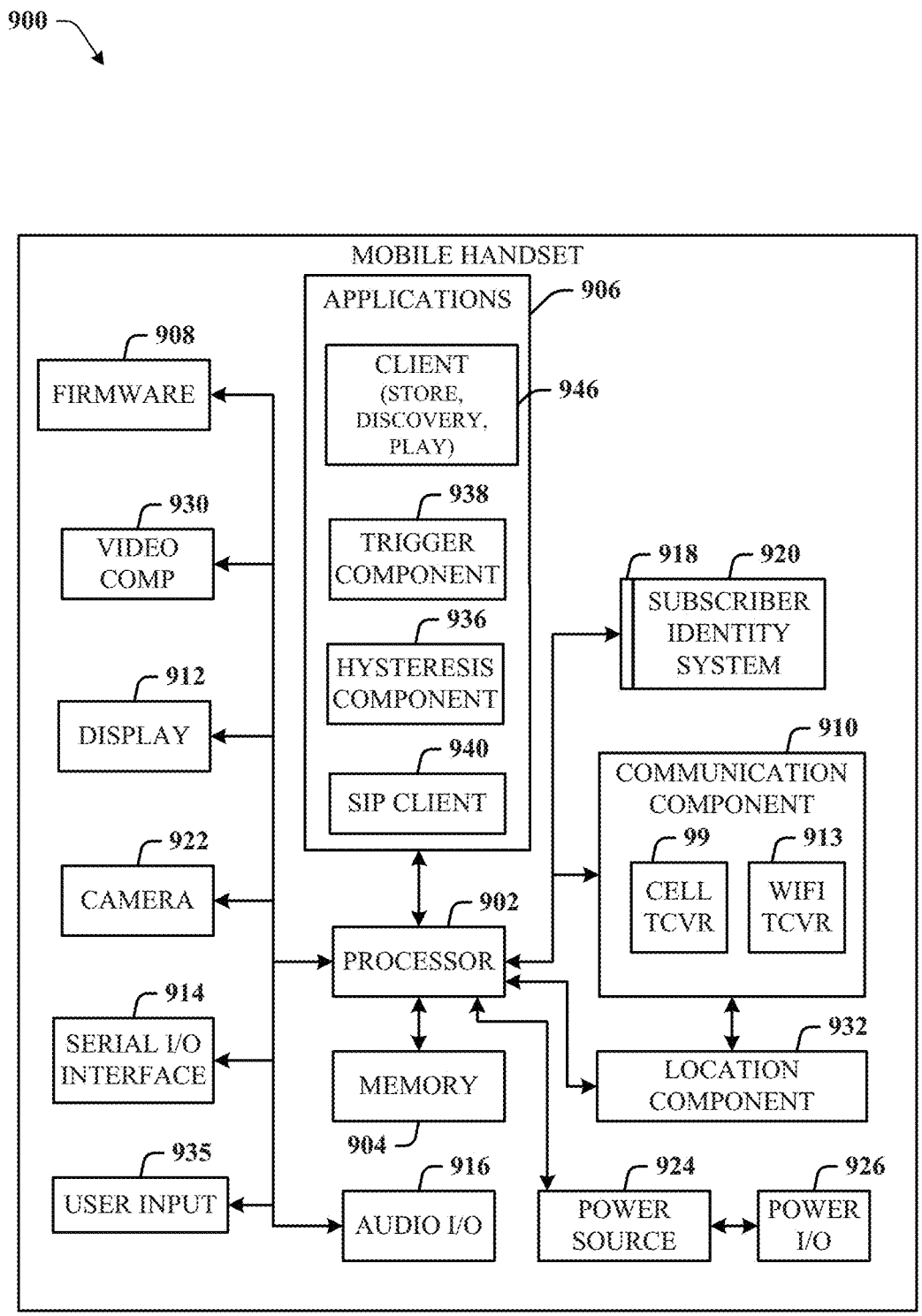
FIG. 9 illustrates an example block diagram of an example user equipment that can be a mobile handset in accordance with various aspects and embodiments of the subject disclosure.

Referring now to FIG. 9, illustrated is a schematic block diagram of an example end-user device such as a user equipment) that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 810, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
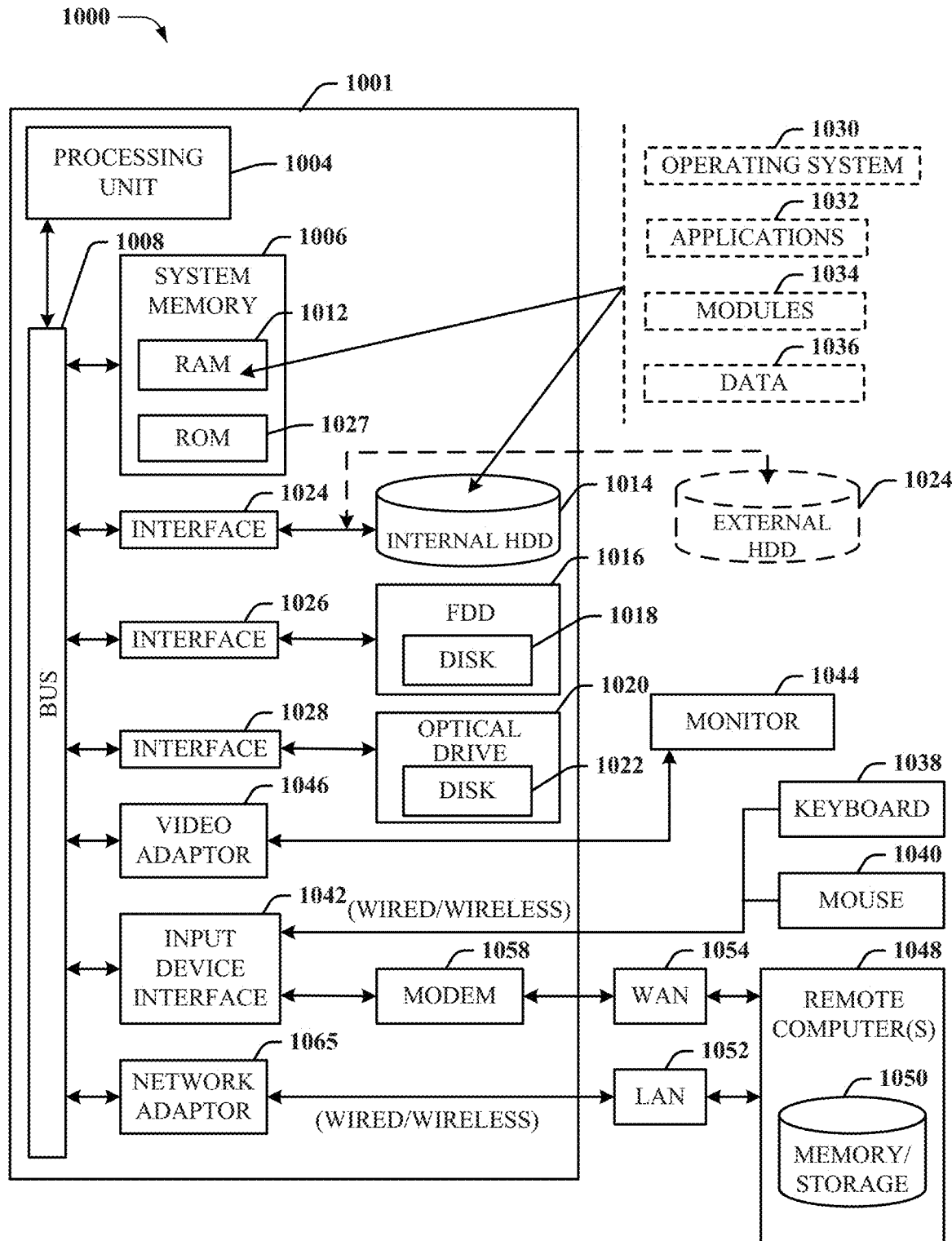
FIG. 10 illustrates an example block diagram of a computer that can be operable to execute processes and methods in accordance with various aspects and embodiments of the subject disclosure.

Referring now to FIG. 10, there is illustrated a block diagram of a computer 1000 operable to execute the functions and operations performed in the described example embodiments. For example, a network node (e.g., network node 106, base station device 502, e.g.) may contain components as described in FIG. 10. The computer 1000 can provide networking and communication capabilities between a wired or wireless communication network and a server and/or communication device. In order to provide additional context for various aspects thereof, FIG. 1 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the various embodiments can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1000 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. Base station equipment, comprising:
   a processor; and
   a memory that stores executable instructions that, when executed by the processor, facilitate performance of operations, comprising:
   transmitting a first indicator to a mobile device to indicate to the mobile device that the base station equipment supports flexible uplink and downlink pairing,
   in response to the transmitting, receiving, from the mobile device, a second indicator that indicates uplink sub-bands supported by the mobile device and downlink sub-bands supported by the mobile device,
   based on a determination that an uplink sub-band of the uplink sub-bands and a downlink sub-band of the downlink sub-bands are not contiguous and are asymmetric in bandwidth, selecting, from a first group of uplink and downlink sub-bands, the uplink sub-band and the downlink sub-band for a communication link with the mobile device, wherein the selecting is further based on a load associated with the uplink sub-band and the downlink sub-band, and
   selecting a replacement uplink sub-band to replace the uplink sub-band in response to the load associated with the uplink sub-band being determined to exceed a defined load threshold, wherein the load associated with the uplink sub-band comprises the load associated with the downlink sub-band.

2. The base station equipment of claim 1, wherein the first indicator comprises a second group of uplink sub-bands and downlink sub-bands supported by the base station equipment.

3. The base station equipment of claim 2, wherein the second group of uplink sub-bands and downlink sub-bands are indicated in a master information block.

4. The base station equipment of claim 1, wherein the downlink sub-band has a larger bandwidth than the uplink sub-band.

5. The base station equipment of claim 1, wherein the downlink sub-band and the uplink sub-band are in different bands.

6. The base station equipment of claim 1, wherein the operations further comprise:
   monitoring the load of the uplink sub-band.

7. The base station equipment of claim 1, wherein the defined load threshold is a first defined load threshold, wherein the load associated with the uplink sub-band and the downlink sub-band comprises the load associated with the downlink sub-band, and wherein the operations further comprise:
   monitoring the load of the downlink sub-band; and
   selecting a replacement downlink sub-band to replace the downlink sub-band in response to the load of the downlink sub-band being determined to exceed a second defined load threshold.

8. The base station equipment of claim 1, wherein the selecting is further based on reducing passive intermodulation interference in response to a detected passive intermodulation interference being determined to exceed a defined interference.

9. A method, comprising:
   signaling, by base station equipment comprising a processor, to a user equipment, a master information block comprising an indication that the base station equipment supports flexible uplink and downlink pairing;
   receiving, by the base station equipment, an indication from the user equipment that indicates a group of uplink sub-bands supported by the user equipment and a group of downlink sub-bands supported by the user equipment;
   based on a determination that an uplink sub-band of the uplink sub-bands and a downlink sub-band of the downlink sub-bands are not contiguous and are asymmetric in bandwidth, selecting, by the base station equipment, the uplink sub-band and the downlink sub-band for a communication link with the user equipment, wherein the selecting is further based on a load associated with a selected sub-band from a first group of uplink and downlink sub-bands, and wherein the load associated with the selected sub-band comprises the load associated with the uplink sub-band; and
   selecting, by the base station equipment, a different uplink sub-band in response to the load of the uplink sub-band exceeding a defined load.

10. The method of claim 9, further comprising:
    transmitting, by the base station equipment, a selection of the uplink sub-band and the downlink band to the user equipment.

11. The method of claim 9, further comprising:
    monitoring, by the base station equipment, the load of the uplink sub-band.

12. The method of claim 9, wherein the defined load is a first defined load, and wherein the load associated with the selected sub-band further comprises the load associated with the downlink sub-band, and further comprising:
    monitoring, by the base station equipment, the load of the downlink sub-band; and
    selecting, by the base station equipment, a different downlink sub-band in response to the load of the downlink sub-band exceeding a second defined load.

13. The method of claim 9, wherein the selecting is further based on an estimated passive intermodulation interference of the uplink band and downlink sub-band being less than a defined interference.

14. The method of claim 9, wherein the downlink sub-band has a larger bandwidth than the uplink band.

15. A user equipment, comprising:
    a processor; and
    a memory that stores executable instructions that, when executed by the processor, facilitate performance of operations, comprising:
    transmitting a first indicator to base station equipment, wherein the first indicator indicates that the user equipment supports flexible uplink and downlink pairing;
    in response to the transmitting, receiving, from the base station equipment, a second indicator that indicates uplink sub-bands and downlink sub-bands supported by the base station equipment;
    based on a determination that an uplink sub-band of the uplink sub-bands and a downlink sub-band of the downlink sub-bands are not contiguous and are asymmetric in bandwidth, selecting the uplink sub-band and the downlink sub-band for a communication link with the base station equipment, wherein the selecting is further based on a corresponding load of a selected sub-band from a first group of uplink and downlink sub-bands; and
    selecting an updated uplink sub-band in response to the load of the uplink sub-band exceeding a defined load.

16. The user equipment of claim 15, wherein the first indicator comprises a second group of uplink and downlink sub-bands supported by the user equipment.

17. The user equipment of claim 16, wherein the second group of uplink and downlink sub-bands are indicated in a master information block.

18. The user equipment of claim 15, wherein the operations further comprise:
   transmitting a selection of the uplink sub-band and the downlink sub-band to the base station equipment.

19. The user equipment of claim 15, wherein the selecting is further based on reducing passive intermodulation interference in response to a detected passive intermodulation interference being above a defined interference.

20. The method of claim 9, wherein the downlink sub-band and the uplink sub-band are different, non-overlapping sub-bands.

* * * * *